US00RE40469E

(19) United States
(12) Reissued Patent
Kim et al.

(10) Patent Number: US RE40,469 E
(45) Date of Reissued Patent: Aug. 26, 2008

(54) APPARATUS AND METHOD FOR INTERPOLATING BINARY PICTURES, USING CONTEXT PROBABILITY TABLE

(75) Inventors: Jong-Deuk Kim, Gyeonggi-do (KR); Hae-Kwang Kim, Seoul (KR); Joo-Hee Moon, Seoul (KR)

(73) Assignee: Hyundai Curital, Inc., Kyoungki-Do (KR)

(21) Appl. No.: 10/944,542

(22) Filed: Sep. 17, 2004

Related U.S. Patent Documents

Reissue of:
(64) Patent No.: 6,453,077
Issued: Sep. 17, 2002
Appl. No.: 09/112,434
Filed: Jul. 9, 1998

(30) Foreign Application Priority Data

Jul. 19, 1997 (KR) ..... 97-31813

(51) Int. Cl.
*G06K 9/32* (2006.01)
*G06K 9/36* (2006.01)

(52) U.S. Cl. ..... 382/300; 382/247

(58) Field of Classification Search ..... 382/298–300, 382/199, 247, 232, 236, 233, 228–229, 239, 382/276, 217–218, 240, 166; 358/525, 451, 358/445; 345/660, 800, 698, 671, 815; 348/441–448, 348/458–459, 625; 375/240.24, 240.25; 341/107
See application file for complete search history.

(56) References Cited

U.S. PATENT DOCUMENTS 5,594,813 A 1/1997 Fandrianto et al.
5,699,129 A 12/1997 Tayama
5,933,105 A 8/1999 Cho
5,960,117 A 9/1999 Hiratani
6,002,812 A 12/1999 Cho et al.
6,823,082 B2 * 11/2004 Hu ..... 382/166

FOREIGN PATENT DOCUMENTS

| | | |
|---|---|---|
| EP | 0625761 | 11/1994 |
| JP | 06-334844 | 2/1994 |
| JP | 07-095394 | 7/1995 |
| JP | 09-093440 | 4/1997 |

OTHER PUBLICATIONS

"MPEG–4 Video Verification model Version 7.0" Int'l Organization for Standardization–Organization Internatinale De Normalisatio, vol. N1642, Apr. 1997, pp. 1–271, XP00861690.

Bossen F et al, "A simple and efficent binary coding technique based on bitmap representation", Acoustics, Speech, and Signal Processing, 1997, 1997 IEEE Int'l Conf. on Munich Germany, pp. 3129–3132.

* cited by examiner

*Primary Examiner*—Ishrat Sherali
(74) *Attorney, Agent, or Firm*—Blakely, Sokoloff, Taylor & Zafman LLP

(57) ABSTRACT

A context probable table of context template is employed in order to interpolate binary picture information. The context template for respective pixels making up the binary picture information is made, and probabilities for the interior of an object and the exterior of the object on its context indexes are obtained from the context probable table arranged previously. The probabilities for the interior and exterior of the object are compared with each other and the binary picture information is interpolated with a value having more probability.

13 Claims, 10 Drawing Sheets

APPARATUS AND METHOD FOR INTERPOLATING BINARY PICTURES, USING CONTEXT PROBABILITY TABLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an interpolation of binary pictures, and more particularly, to an apparatus and method for interpolating binary picture information based on a context probable table, namely, by employing a context probable value of a context based-arithmetic encoding.

2. Discussion of Related Art

There is some difference between an original picture and a picture down-sampled and up-sampled after the down-sampling in case that the binary picture information is down sampled and then up sampled in performing a loss coding for picture information for the sake of a compression of binary picture information. Thus, in a process of the loss coding a picture of down-sampled small size is coded and a decoder decodes the picture of the small size to thereby perform an up-sampling for the picture in an original size. The loss coding is executed like this through the down and up sampling process. In the up-sampling process, a binary picture block of 4×4 or 8×8 having a low resolution is converted into a sampled binary picture block of 16×16 having a high resolution, by applying an interpolation to the up-sampling process.

Figure 1:
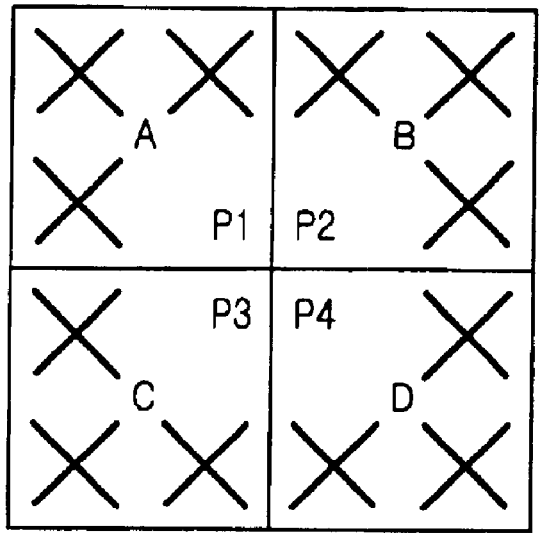

There is presented a linear interpolating method, as a regularity of the existed interpolation process, in the Verification Model (VM) 8.0 described on WG11 under the ISO/IEC. In such linear interpolation method, in case the interior of an object is as '1' and the exterior of the object is as '0', and also in case that A, B, C and D in FIG. 1 are as known values, values of P1, P2, P3 and P4 should be decided. The P1, P2, P3 and P4 in FIG. 1 are pixels to be interpolated.

In such process, the values of P1, P2, P3 and P4 are decided by the following method.

P1: if (2*A+B+C+D>2) then '1' else '0'

P2: if (A+2*+B+C+D>2) then '1' else '0'

P3: if (A+b+2*C+D>2) the '1' else '0'

P4: if (A+B+C+2*D>2) then '1' else '0'

That is to say, in P1, a value of pixel A most neighboring to P1 is multiplied by 2, then added to the rest known pixels, B, C and D, and then if its sum is more than 2, P1 becomes as '1', if not, P1 is as '0'. In P1, P2, P3 and P4, a value of pixel B, C or D most neighboring to P2, P3 or P4 is respectively multiplied by 2, then each of the multiplied values is added to the rest known pixels and then if its sum is more than 2, it becomes as '1', if not, P1 is as '0'.

In such conventional linear interpolation method, among pixels neighboring to an interpolating pixel, the number of pixels such as the interior of an object is compared to the number of pixels such as the exterior of the object, it is decided according to more number in the comparison result whether or not it is the interior of the object or the exterior of the object. In order to use more accurate method, there is provided a method that nearer pixel more influences upon the interpolating pixel according to an additional value based on a distance between the interpolating pixel and referring adjacent pixels.

Such linear interpolating method is to interpolate the picture information by considering the number of the interior and exterior pixels of four pixels adjacent to a coding pixel and multiplying its nearest pixel by 2. A correlation in such linear interpolating method is not accurate. Thus, considering that the correlation among pixels of neighboring natural pictures is high, using a statistical method capable of characterizing numerically the correlation among respective pixels is a method for performing more accurate interpolation, in case that a functional relation representing such correlation can not be defined.

In the context-based arithmetic encoding, a probability which pixels of a coding binary picture can have a value of '0' or '1', may be gotten by using pixels neighboring to a coding pixel. Namely, in case the coding pixel is '0', a probability that a current pixel may be '0' is experimentally gotten according to a distribution of the neighboring pixels. The arithmetic encoding is performed by employing such probability.

In order to get probable value of current pixels through a use of adjacent pixels, it is constructed context templates for deciding what adjacent pixels at which positions are used, to thereby get the probable values for the respective context templates.

Figure 2A:
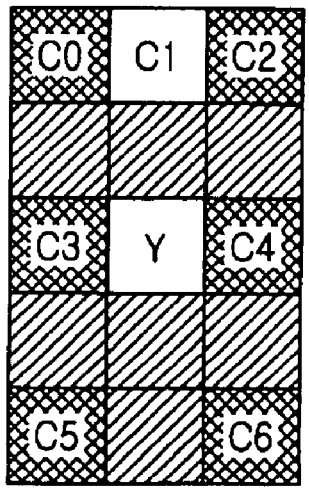
Figure 2B:
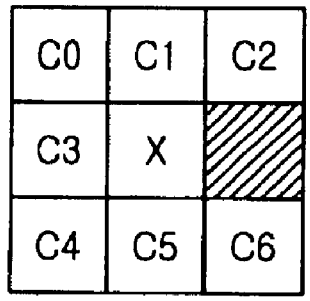

FIGS. 2(a) and 2(b) show one embodiment of context templates.

Supposing in FIG. 2(a) that parts of oblique lines are pixels for unknown values and checkered parts are '1' in its value, values of context indexes Cs may be obtained by the following, e.g., $$\begin{aligned} C &= C6*2^6 + C5*2^5 + C4*2^4 + C3*2^3 + C2*2^2 + C1*2^1 + C0*2^0 \\ &= 0*2^6 + 1*2^5 + 0*2^4 + 1*2^3 + 1*2^2 + 0*2^1 + 1*2^0 \\ &= 45 \end{aligned}$$

The probable values are in general floating values between 0 and 1, but there is much difficulty to process the floating values between 0 and 1 by using only software and hardware. The floating values between 0 and 1 are thus normalized to integer values, then used. Namely, the values between 0 and 1 are normalized to integer values between 1 and 65535. The number of arrayals constituting the probable table is decided by the number of pixels constituting a context template. If the number of pixels constituting the context template is N, the number of probable values is as $2^N$. In horizontal and vertical contexts used for scalable binary picture information, as shown in FIGS. 2(a) and 2(b), each of templates is constructed by 7 pixels, the number of the probable values thus is 128. Meanwhile, referring to the probable table on the ISO/IEC WG11 VM 8.0, it has the number of 256 for the probable values. Therefore, the first number of 128, context indexes from 0 to 127, is for the probable values of horizontal context template, and the rest number of 128, context indexes from 128 to 255, is for the probable values of vertical context template.

Accordingly, as a calculating result by the aforementioned expression, the context index C in FIG. 2(a) is 45, it is thus read an index value 45 on the probable table for the calculated context index. Namely, the probable table is constructed such as scalable_shape_intra[256]={65476, 64428, . . . , 2412, 35} on the ISO/IEC WG11 VM 8.0, and in reading the probable values, values between 0 and 127 are used in the horizontal interpolation and then values between 128 and 255 are used in the vertical scanning. In such a case, the scalable_shape_intra[45] may become the probable value for the above-mentioned context. For such a value, when the value is read from the probable table of VM 8.0 presented on ISO/IEC WG11, the value becomes '22794'. Since '22794' is the probable value for a probability of the exterior of an object, a probable value for the interior of object becomes '65535−22794=42741'.

Such probable value is previously decided and commonly stored at coding and decoding apparatuses, and coding data using coded probable value is transmitted to the decoding apparatus. The decoding apparatus decodes the probable value for the received data.

As afore-mentioned, in a case of utilizing the context probable table used in the CAE, more accurate interpolation can be achieved than a conventional linear interpolation method. In using the context probable table used in the CAE coding method, when many experimental pictures have the same contexts for respective contexts, the number of cases that its pixels are as the interior and the exterior of an object, is checked in order to get a probability for which each of the contexts is as the interior of the object. In such context probable table, thus, the probable table is made not only including the number of pixels as the interior of object and pixels as the exterior of object, in adjacent pixels, but also including information for positions and a correlation. That is, the method for using such context probable table is to interpolate more accurately than the method for using only the number of pixels as the interior and exterior of the object of neighboring pixels.

SUMMARY OF THE INVENTION

Accordingly, the present invention is directed to an apparatus and method for interpolating binary picture information that substantially obviates one or more of the limitations and disadvantages of the related art.

An object of the present invention is to provide an apparatus and method for interpolating binary picture information by using a context probable table, which is capable of together considering a distance between pixels, positions of pixels and a sort of neighboring pixels through a use of the context probable table of the CAE.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, binary picture information is divided into blocks of a given size and a bordering on the divided blocks is executed by using its adjacent blocks. In case that a corresponding block belongs to the uppermost or leftmost block of the inputted binary picture information, the uppermost row or the leftmost column of the corresponding block is copied and a bordering on it is performed. A context template is constructed by employing pixels neighboring to coding pixels of a corresponding block. Values of indexes are also gained through a use of the constructed template, and a probability for the indexes is read on a probable table. Probability as the exterior of an object and the interior of object is gained from the read probability, and its two values are compared with each other. If the probability as the interior of object is more than that of the exterior of object, an interpolation is performed with the interior value of object. If the probability as the exterior of object is more than that of the interior of object, an interpolation is performed with the exterior value of object.

It is to be understood that both the forgoing general description and the following detailed description are exemplary and explanatory detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows an explanation diagram providing a linear interpolation process applied in an up-sampling of binary picture information.

FIGS. 2(a) and 2(b) represent one embodiment of a context template applied to the binary picture information.

Figure 3:
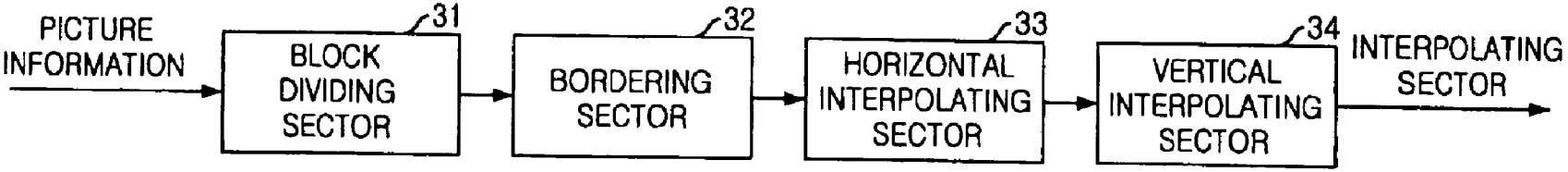

FIG. 3 sets forth the construction for one preferred embodiment of an inventive interpolating apparatus.

Figure 4:
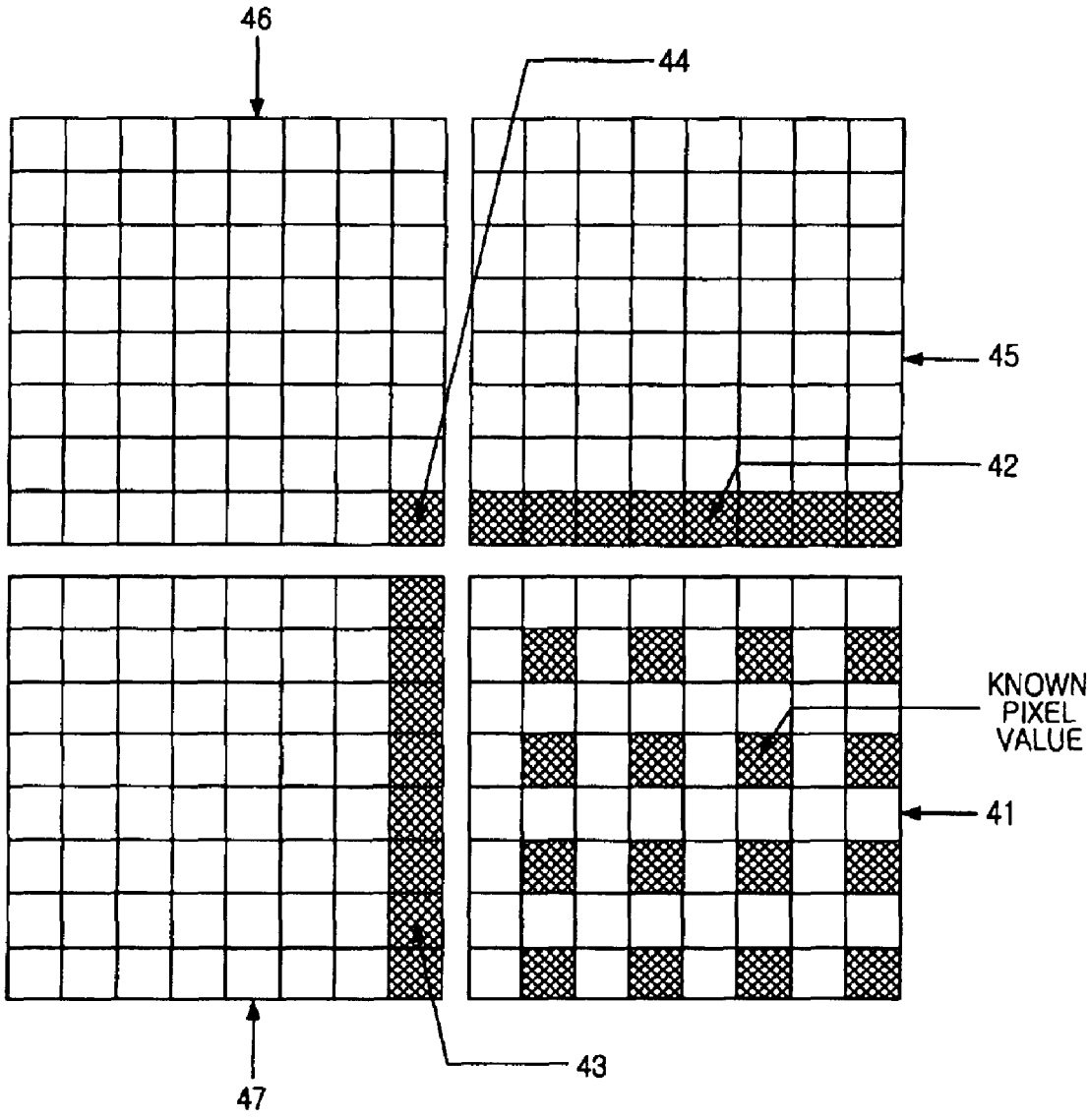

FIG. 4 depicts a method for bordering pixels of a neighboring block in order for constructing a context of pixels corresponding to the leftmost column and the uppermost row of a current block.

Figure 5:
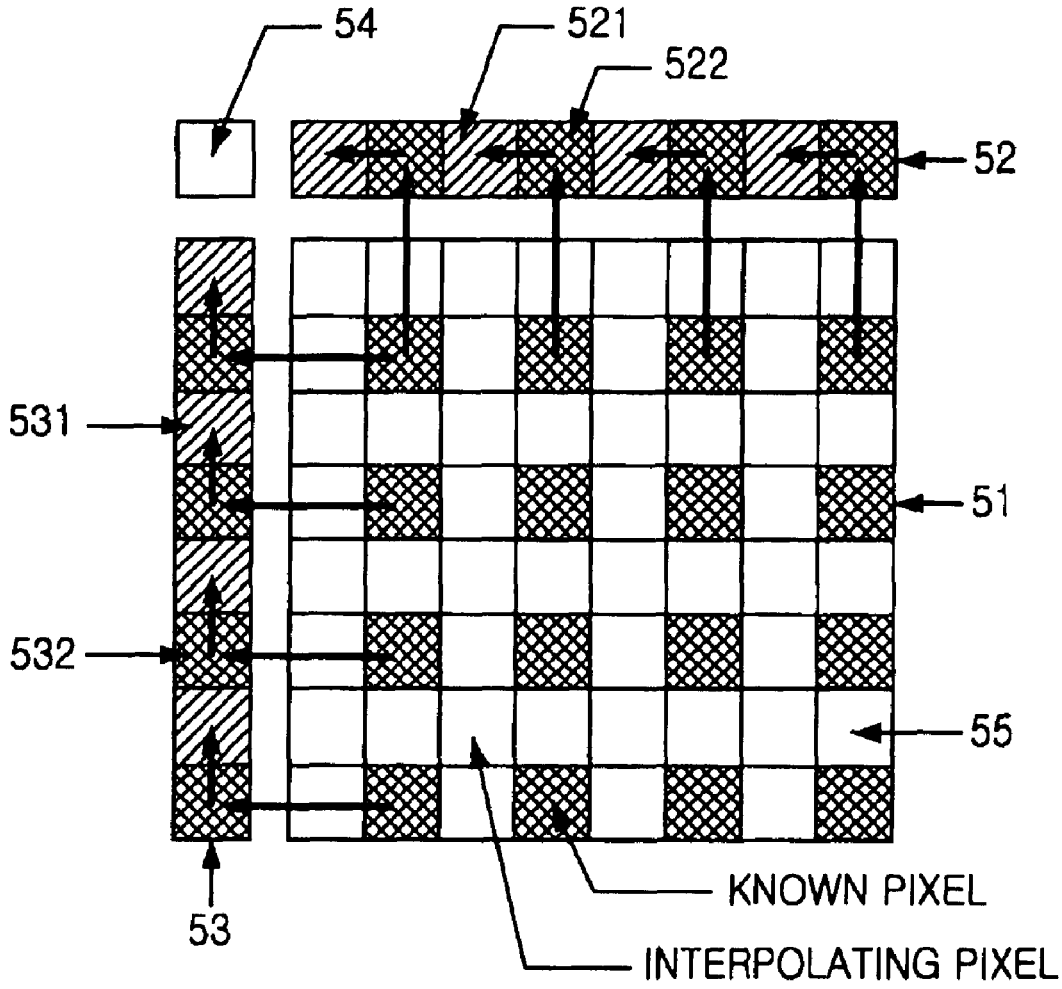

FIG. 5 offers a method for bordering a block positioned on the uppermost or leftmost side of a binary picture.

Figure 6:
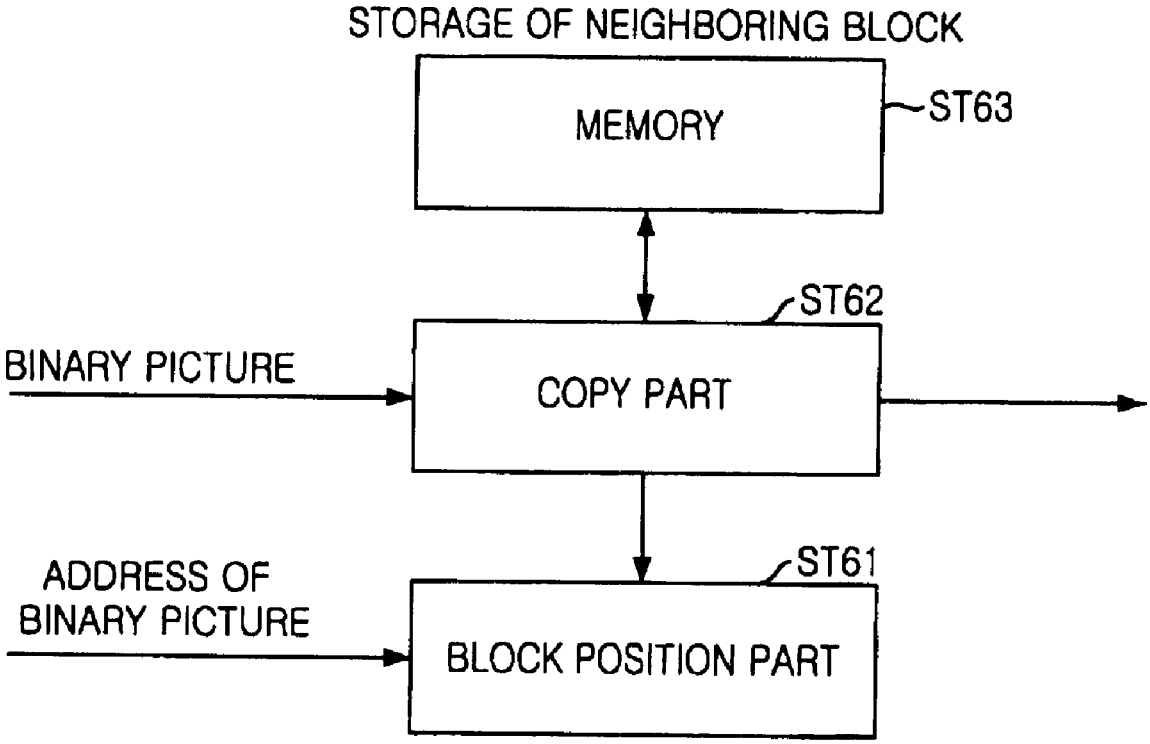

FIG. 6 illustrates the construction for one embodiment of a bordering sector in accordance with the present invention.

Figure 7:
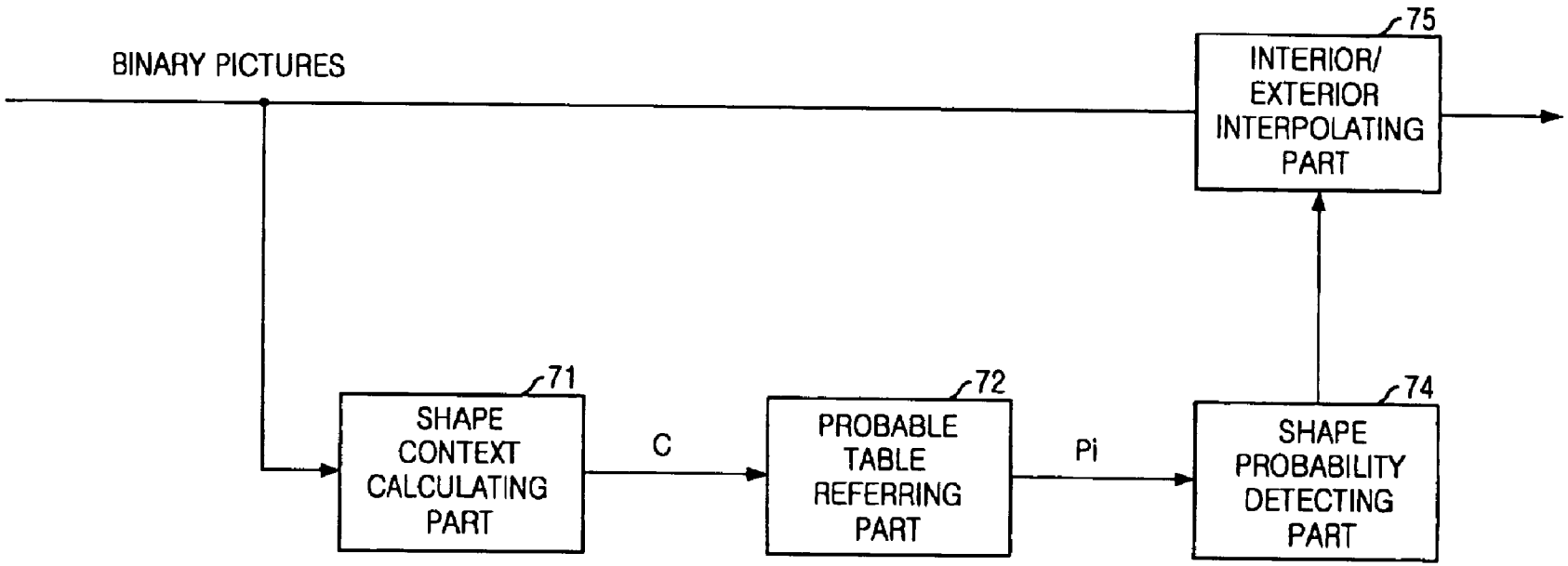

FIG. 7 presents one embodiment of an inventive horizontal and vertical interpolating sector.

Figure 8A:
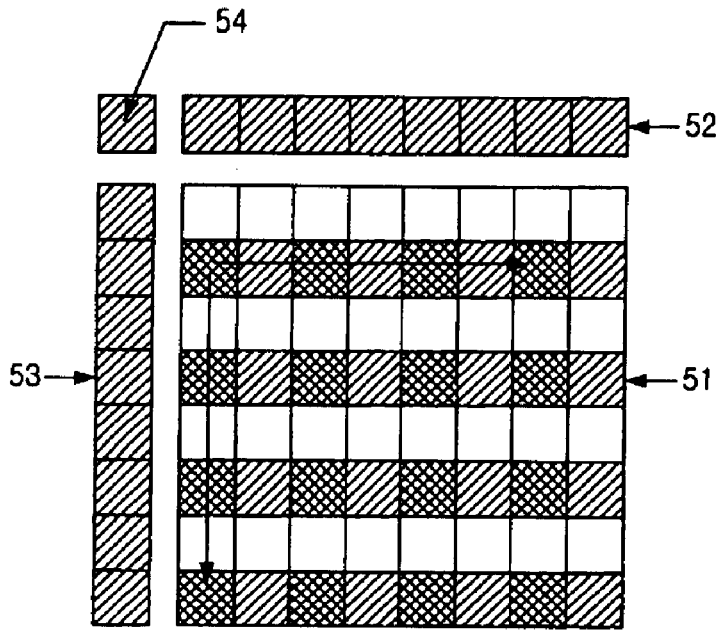
Figure 8B:
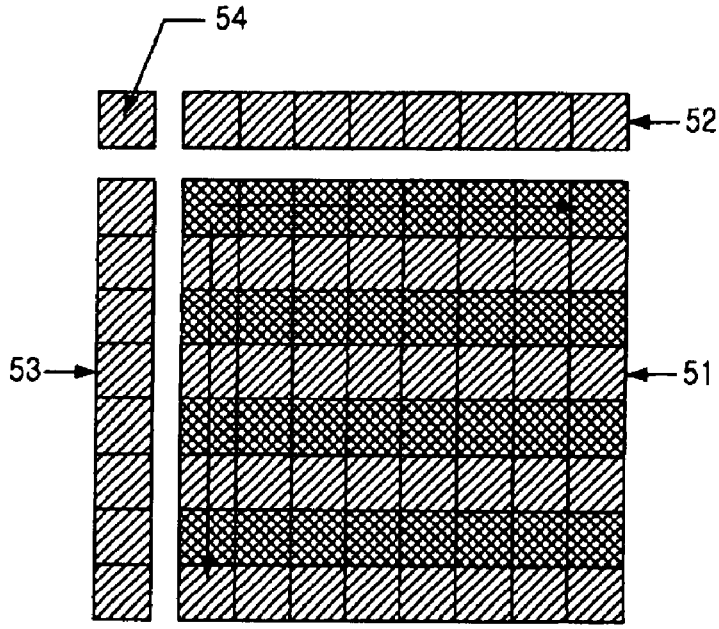

FIGS. 8(a) and 8(b) are explanatory diagrams showing horizontal and vertical interpolation processes.

Figure 9:
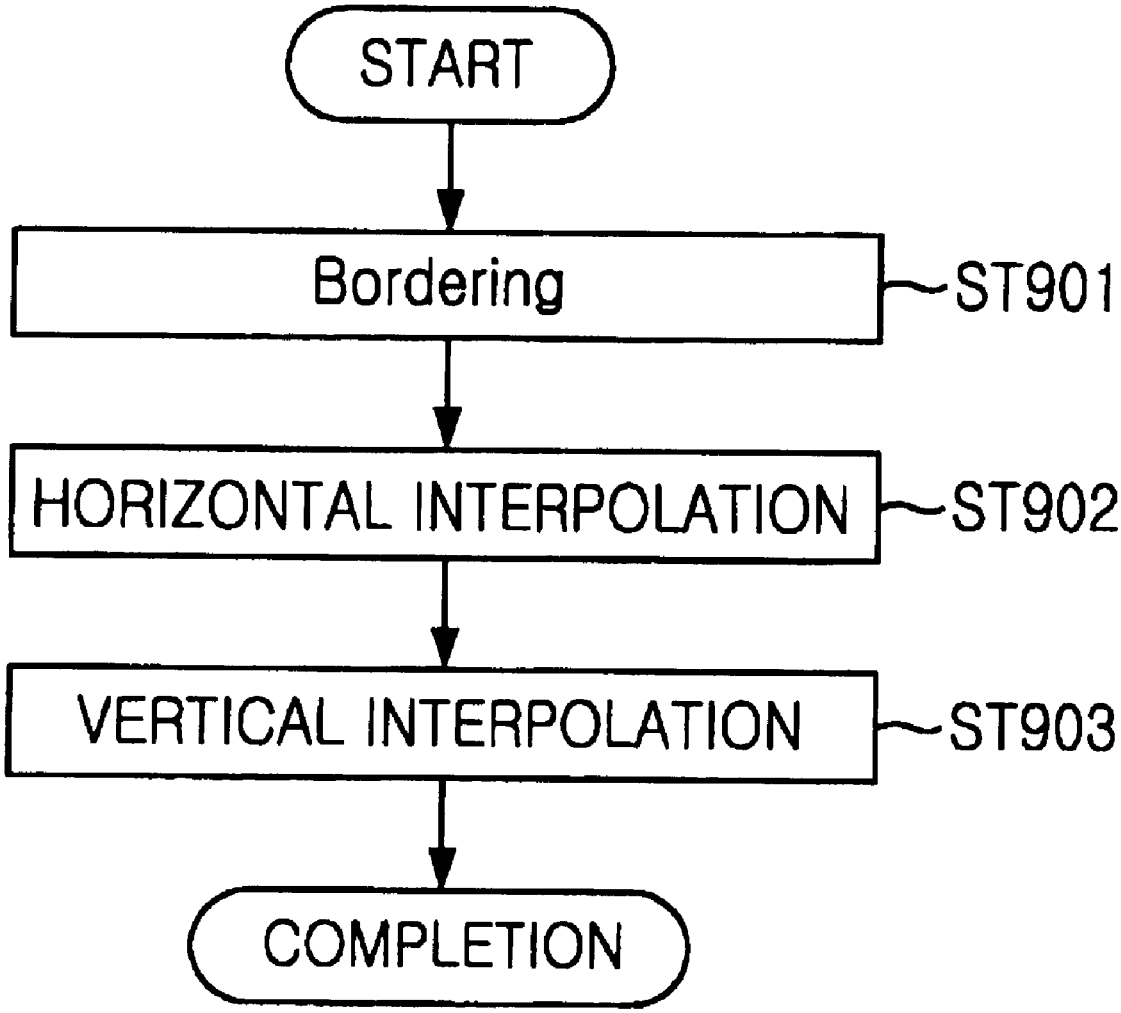

FIG. 9 indicates a flow chart providing an interpolating method in the invention.

Figure 10:
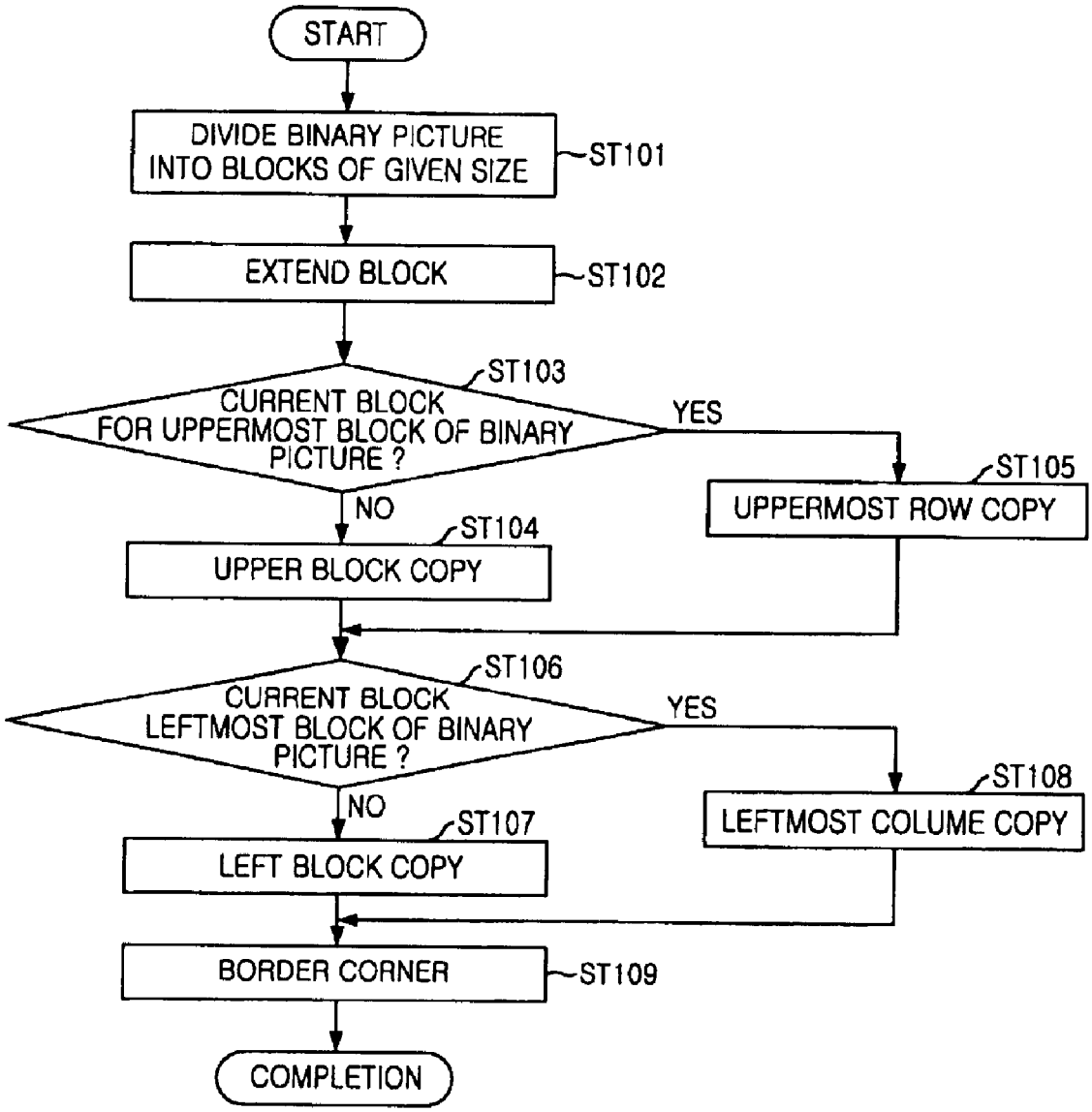

FIG. 10 is a flow chart showing an inventive bordering process.

Figure 11:
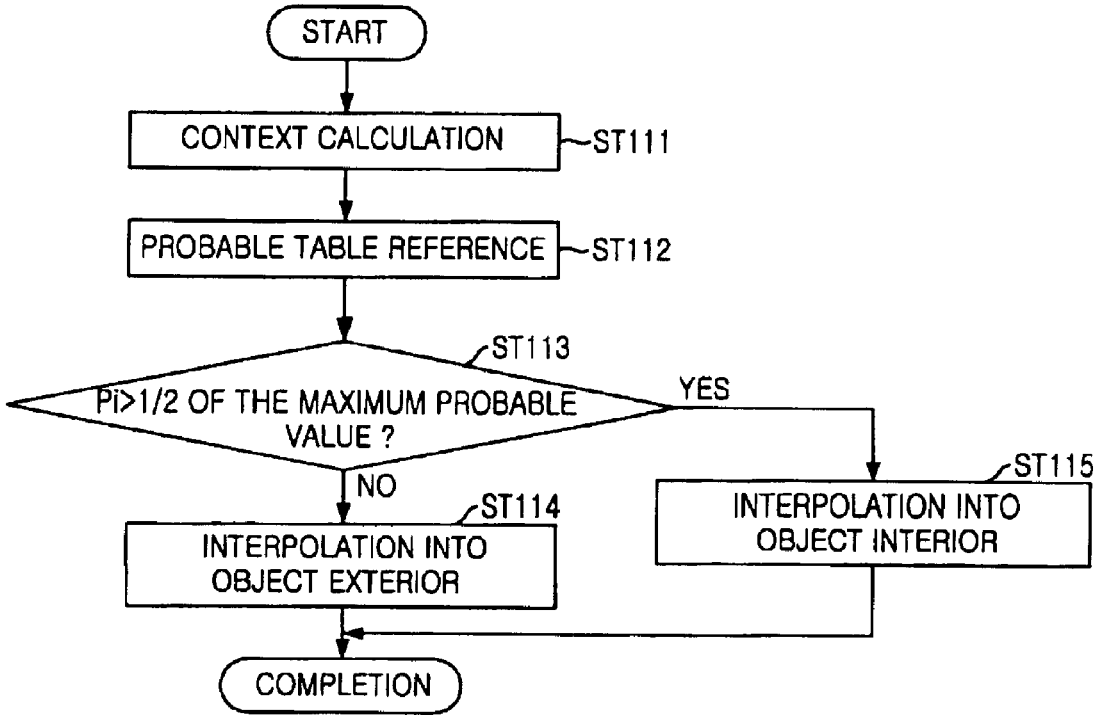

FIG. 11 presents a flow chart for horizontal and vertical interpolating processes in the present invention.

DETAILED DESCRIPTION OF PREFERRED EMBODIMENT

Reference will now be made in detail to the preferred embodiments of the present invention, examples of which are illustrated in the accompanying drawings.

FIG. 3 shows one embodiment with the construction of an inventive interpolating apparatus.

A block dividing sector 31 divides binary picture information into blocks of a given size, e.g., 16×16, 8×8, etc. A bordering sector 32 executes a bordering on blocks outputted from the block dividing sector 31. A horizontal interpolating sector 33 horizontally interpolates pixels of the blocks outputted from the bordering sector 32. A vertical interpolating sector 34 vertically interpolates pixels of the blocks outputted from the horizontal interpolating sector 33.

Binary picture information of an object is divided into blocks of a given size in the block dividing sector 31. These blocks are bordered with columns and rows of blocks adjacent to its left, upper and upper-left sides in the bordering sector 32. In an interpolating process, a context template is constructed with pixels neighboring to an interpolating pixel as shown in FIGS. 2(a) and 2(b), and its context indexes are calculated. Such context template is presented on the VM of the ISO/IEC WG11.

As shown in FIGS. 2(a) and 2(b), the horizontal and vertical contexts for respective pixels are constructed, and context indexes C are computed. In case pixels adjacent to a current pixel form a context like the above, there may be constructed $2^7$ kinds of contexts according to a distribution of pixel values constituting the context.

The $2^7$ kinds of contexts and its probable values constituting respective contexts correspond with each other in one to one by the indexes C gained by the following expression (1).

$$C = \sum_{i=0}^{6} C_i \cdot 2^j \tag{1}$$

In a process for gaining a probable value, it is progressed that a context is constructed as shown in FIGS. 2(a) and 2(b), and a value of context index is gotten through the above-mentioned expression (1), and a probable value Pi corresponding to the index is read on a context probable table. Such a probable value is a probability for the interior of an object, and according to a size of the value, '0' indicating the exterior of object or '1' indicating the interior of object is selected.

In the context template constructing process as the above, a context template for outermost pixels positioned on the left and upper sides of a current block can not be constructed as shown in FIGS. 2(a) and 2(b). In other words, when the leftmost column is interpolated in the horizontal interpolating process, there are no pixels corresponding to C0, C3 and C5 of FIG. 2(a), and when the uppermost row is interpolated, there are no pixels corresponding to C0, C1 and C2 of FIG. 2(a). In the vertical interpolating process, also, for the leftmost column there are no pixels corresponding to C0, C3 and C4 of FIG. 2(b), and when the uppermost row is interpolated, there are no pixels corresponding to C0, C1 and C2 of FIG. 2(b).

Thus, in order to interpolate pixels corresponding to the leftmost column and uppermost row of a current block, a bordering should be done before the interpolation. As shown in FIG. 4, pixel values of corresponding positions in an adjacent block are brought and the brought pixel values construct such required pixels, and such a process is said as, a bordering.

In order to construct a context of pixels corresponding to the leftmost column and uppermost row of a current block, the pixels in the adjacent block are bordered on the current block as shown in FIG. 4. Since blocks positioned on the outermost side of an inputted binary picture have not neighboring blocks, its own leftmost column and uppermost row are copied on the right and left sides in executing the bordering.

The bordering process is described more in detail as follows.

First, in case the current block 41 is not the uppermost block and the leftmost block of binary picture, namely, in case blocks on its upper and left sides exist, a top border 42 is made with the lowermost row of a top block 45 neighboring to the upper side of the current block 41, and a left border 43 is made with the rightmost column of a left block 47 adjacent to the left of the current block 41. A corner border 44 is constructed with the rightmost-lowermost pixel value near to the top-left side of the current block 41.

Next, in other case, namely, in case a current block 41 is the uppermost or leftmost block of the inputted binary picture, referring to FIG. 5 there is illustrated a method for bordering a block positioned on the uppermost or leftmost side of the binary picture. If the current block is the uppermost block, a pixel value of a top block can not be used for the bordering as afore-mentioned since a block does not exist on the top side.

A top border 52 is constructed by copying the uppermost row of a current block 51, which represents pixels known before an up-sampling and shown in a checkered type on a second row of FIG. 5. On the copied top border 52, pixels for unknown values 521, 521, . . . among pixels for known values 522, 522, . . . are constructed by copying the known pixels 522, 522 . . . positioned on its right or left side.

If the current block is the leftmost block of the inputted binary picture, a left border 53 is constructed by utilizing known pixels before an up-sampling, which are presented as a checkered type in FIG. 5, on the leftmost column of the current block 51, which are pixels known before the up-sampling and shown in a checkered type on a second column of FIG. 5. Pixels for unknown values 531, 531, . . . among pixels for known values 532, 532, . . . are constructed by copying the known values of pixels 532, 532 . . . positioned on its top or lower side. Like this, in case the current block is the leftmost or uppermost side of the inputted binary picture, the corner border may be determined as a value of '0' or '1'.

Meanwhile, in case pixels on the rightmost column of the current block or on its lowermost side are interpolated, a context template for the rightmost and lowermost pixels of the current block can not be formed as shown in FIGS. 2(a) and 2(b). Namely, there are no pixels corresponding to C5 and C6 of FIG. 2(a) in case the lowermost row is interpolated in a horizontal interpolating process. In a vertical interpolating process, there are no pixels corresponding to C2 and C6 of FIG. 2(b) in case the rightmost row is interpolated. In this case, but, the bordering is not executed, a voluntary value is determined by a software, to thereby construct a context template, in a context calculating part 71 mentioned later.

FIG. 6 provides one embodiment with the construction of an inventive bordering sector.

A block position detecting part 61 receives an address of a current block 41 from the inputted binary picture and detects a position of the current block 41. A copy part 62 receives the position of current block outputted from the block position detecting part 61 and borders on the top, top-left and left side of the current block 41 in a block of a given size. A memory 63 stores blocks from the copy part 62 and outputs blocks 45, 46, 47 adjacent to the current block 41 to the copy part 62.

The block position detecting part 61 receives addresses of pixels constituting the block inputted to the copy part 62, detects a position of the current block and outputs its position signal to the copy part 62. The copy part 62 detects by the inputted position signal whether or not a block position of the currently inputted binary picture belongs to the uppermost or leftmost block.

As its detection result, in case it corresponds to the uppermost or leftmost block, the uppermost row or the leftmost column of the current block is copied on its left or top, to thereby perform the bordering. For pixels for unknown values, namely, pixels before an up-sampling, 521, 521, . . . , 531, 531, . . . , on the uppermost row or the leftmost column, the bordering is executed by copying pixels positioned on its right and left or its upper and lower sides as aforesaid.

If the current block does not correspond to the uppermost or leftmost block, as above-mentioned the top border 42 is made with the lowermost row of the top block 45 neighboring to the upper side of the current block 41, and the left border 43 is made with the rightmost column of the left block 47 adjacent to the left of the current block 41. The corner border 44 is constructed with the rightmost-lowermost pixel value near to the top-left side of the current block 41. Under such a bordered state, the horizontal and vertical interpolations are done.

FIG. 7 sets forth one embodiment of an inventive horizontal or vertical interpolating sector.

A shape context calculating part 71 receives the bordered block from the bordering sector 32, constructs a horizontal context shown in FIG. 2(a) for each of the pixels, and calculates context indexes. A probable table referring part 72 receives the context indexes from the context calculating part 71, reads probable values Pi corresponding to the indexes on a context probable table stored previously, and inputs the read values. A shape probability detecting part 74 detects whether or not the object interior probable value Pi read in the probable table referring part 72 is more than ½ of probable maximum value. An interior/exterior interpolating part 75 interpolates binary information into the interior or exterior of an object in response to a detection signal outputted from the probability detecting part 74.

The construction of the horizontal interpolating sector 33 is equally applied to the vertical interpolating sector 34. In the horizontal interpolating sector 33, the context calculating part 71 constructs the horizontal context shown in FIG. 2(a) and gets context indexes. In the vertical interpolatng sector 34, the context calculating part 71 constructs the vertical context shown in FIG. 2(b) and gets indexes.

A block bordered in the housing sector 32 is inputted to the context calculating part 71, and the horizontal context shown in FIG. 2(a) is therein constructed for respective pixels constituting the current block, and then context indexes C are calculated.

By the way, in case that the context template shown in FIG. 2(a) is constructed in order to horizontally interpolate the rightmost column of the current block, an eighth column of the current block 51 shown in FIG. 5, and in case that the context template shown in FIG. 2(a) is constructed in order to horizontally interpolate the lowermost row of the current block, an eighth row of the current block 51 shown in FIG. 5, there are no pixels corresponding to C5 and C6. In the vertical interpolation, also, in case the context template for the rightmost column of the current block 51 is constructed, there are no pixels corresponding to C2 and C6 of FIG. 2(b).

However, the bordering for the rightmost column and the lowermost row of the current block 51 is not executed in the bordering sector 32, thus, the context calculating part 71 copies neighboring pixels or determines voluntary values through the software, for parts that there do not exist pixels, in constructing the context template shown in FIGS. 2(a) and 2(b). The context sample template is constructed by such a process in the context calculating part 71, to then get context indexes.

The probable table referring part 72 reads and inputs the probable value Pi that the current pixel may be the interior of object, from the portable table stored according to the context indexes. The probability detecting part 74 compares the object interior probable value Pi read by the probable table referring part 72 with ½ of the maximum probable value, and outputs a signal for interpolating with the object interior value to the interior/exterior interpolating part 75 in case that the object interior probable value Pi is more than ½ of the maximum probable value. In case that the objct interior probable value Pi is less than ½ of the maximum probable value, the probability detecting part 74 outputs a signal for interpolating with the object exterior value to the interior/exterior interpolating part 75. The interior/exterior interpolating part 75 interpolates the binary picture information into the interior or exterior of the object in response to a detection signal for interpolating with the interior or exterior value.

FIG. 8(a) depicts a block of 8×8 completed in a horizontal interpolating process.

Pixels shown in oblique lines in FIG. 8(a) are known previously before an interpolation, a context template of FIG. 2(a) for pixels shown in checkered design in FIG. 8(a) is made to get context indexes, a probable value for an object interior is gotten from a probable table by using the context indexes and interpolated into the interior or exterior of the object. In the horizontal interpolating process, the horizontal context template of FIG. 2(a) from a pixel positioned on a second row and first column of the current block 51 is made, then the interpolation process is done successively in the right direction from that to an eighth row and seventh column of the current block 51. Interpolating from a pixel positioned on the top and left side like this has a reason why an order of a coding and decoding on pictures is executed from the left and upper side, thus pixel values of blocks on the upper and left side are known previously.

When the pixels of checkered design are gotten in the horizontal interpolating process in FIG. 8(a), pixels of checkered design in FIG. 8(b), pixels on first, third, fifth and seventh rows, are interpolated in the vertical interpolating process. In the vertical interpolating process, the context template of FIG. 2(b) is constructed and the interpolation process is done successively in the right direction, from a pixel positioned on a first row and first column of the current block 51 to a pixel of the first row and second column, . . . , a pixel of the first row and eighth column, a pixel of a third row and first column, . . . , a pixel of a seventh row and eighth column.

Such interpolation in the right direction from the leftmost side of the current block is not only for a reason why the coding and decoding order of pictures is performed from the left and top side but also for a reason why the context template of FIG. 2(b) is constructed by using pixels positioned on the left side of the current pixel X.

FIG. 9 offers a flow chart showing an inventive interpolating method.

In a step ST901, binary picture information is divided into blocks of a given size, e.g., 16×16, 8×8, etc., and bordering blocks 52, 53 are bordered on the top and left sides of respective blocks 51. In a step ST902, a horizontal interpolation process is performed for pixels constituting the bordered block. In a step ST903, a vertical interpolating process is executed for blocks completed in the horizontal interpolation process. Herewith, it is not always necessary to execute the horizontal interpolation process first surely, and there is not much difference even though the vertical interpolation first and the vertical interpolation next are done.

FIG. 10 is a flow chart providing a bordering process in accordance with the present invention.

In a step ST101, the binary picture information is divided into blocks of a given size, e.g., 8×8, etc. In a step ST102, a current block is extended in a given size. For instance, a block of 8×8 is extended into a block of 16×16, by selecting one pixel among 2×2 for pixels having known its value such as the blocks 41, 51 of FIGS. 4 and 5 aforesaid. In a step ST103, it is detected whether or not one block is the uppermost block of the binary picture information. If it is the uppermost block, in a step ST104 the uppermost row of the current block is bordered on the top of the current block. If it is not the uppermost block, in a step ST105 the lowermost row of a block neighboring to the upper side of the current block is bordered on the top of the current block. In a step ST106, it is detected whether or not the current block is positioned on the leftmost side of the binary picture. In case the current block is positioned on the leftmost side, in a step 107 the leftmost column of the current block is bordered on the left of the current block. In case the current block is not positioned on the leftmost side, in a step 108 the rightmost column in the left neighboring block of the current block is bordered on the left of the current block. In a step 109, a pixel on the rightmost and lowermost side of a block positioned on the top and left side of the current block is bordered on a corner of the top and left side of the current block.

FIG. 11 illustrates a flow chart showing horizontal and vertical interpolating processes in the invention.

In a step ST111, for respective pixels constituting the block bordered through a bordering process, the context template shown in FIG. 2(a) is made and context indexes are calculated. In a case of the vertical interpolation, the context template shown in FIG. 2(b) is used. In a step ST112, a probable value within an object, stored in the probable table referring part 72, is read and inputs the read values thereto by using the context indexes gotten in the step ST111. In a case of the vertical interpolation, the probable table referring part 72 is used. In a step ST113, it is detected whether or not the probable value Pi is more than ½ of the maximum probable value. Herewith, a case that the probable value for the object interior, Pi, is more than ½ of the maximum probable value, represents that the probable value for the object interior, Pi, is more than the probable value for the object exterior, Po. If the probable value for the object interior, Pi, is more than ½ of the maximum probable value, in a step ST115 a value of the current pixel is determined as '1' and this value is given as a pixel value of the object interior. If the probable value for the object interior, Pi, is less than ½ of the maximum probable value, in a step ST114 a value of the current pixel is determined as '0' and this value is given as a pixel value of the object exterior.

In a description of the present invention as aforementioned, the invention was applied to a case of dividing picture information into blocks of a given size. Meantime, the present invention can be also performed by extracting a video object plane (VOP) and applying the context index calculation, a computation of a probable value, a comparison of the probable values and exterior/interior interpolation processes thereto, for pixels constituting the VOP. Further, the unit for an interpolation may be a frame unit, a VOP unit, or a macro block (MB) unit.

The practical field in employing the present invention has an MPEG-4 scalable binary picture information coding. In order to display a base layer in the MPEG-4 scalable binary picture information coding, an interpolation process for changing the base layer to a picture of a size such as that in an enhancement is done. Since a CAE is utilized in coding the enhancement layer at this time, the probable table for respective contexts are arranged. Accordingly, in case that the same contexts used for the scalable coding in the interpolation process are employed, there is no need to make separately the probable tables since the same probable table can be utilized in the interpolation.

As above-mentioned, in accordance with the present invention, for an interpolating pixel a context template is made with its adjacent pixels, its context probable value is obtained, and probable values for the object interior and the object exterior are compared with each other. The binary picture information is then interpolated by a value provided from a case of more probable value as its comparison result, to thereby achieve an accurate interpolation.

It will be apparent to those skilled in the art that various modifications and variations can be made in the binary picture information interpolating method and apparatus of the present invention without deviating from the spirit or scope of the invention. Thus, it is intended that the present invention cover the modifications and variations of this invention provided they come within the scope of the appended claims and their equivalents.

What is claimed is:

1. A method for interpolating an original picture in a frame unit (a binary picture: BAB) by using a context probability table set previously in order to reconstruct the original picture in the frame unit having low resolution as the picture having high resolution through an up-sampling, said method comprising the steps of:

dividing said original picture in the frame unit into a plurality of blocks (each having a size of 8×8 pixels);

extending each of said plurality of blocks divided to a double size;

forming a context template for an interpolating pixel in each of the extended blocks;

getting indexes of the context template to obtain a probability value indicating whether or not a pixel value is detected and obtaining the probability value of the interpolating pixel from the context probability table set previously by a use of the indexes of the context template obtained; and deciding the interpolating pixel value ('0' or '1') based on the context probability value obtained of the interpolating pixel.

2. The method of claim 1, wherein the context template forming step constructs the context template for a part having no pixels by copying neighboring pixels or determining a voluntary value, in case that the context template is constructed for pixels of 16 columns or 16 rows.

3. The method of claim 1, wherein said context probable table includes the probable values previously gained for all context templates and is commonly stored at coding and decoding apparatuses.

4. The method of claim 1, wherein a value of said interpolating pixel is determined as an interior pixel value if the probability value for the interior is more than that for the exterior in said context probability template of said interpolating pixel, and is determined as an exterior pixel value if the probability value for the exterior pixel is more than that for the interior therein.

5. The method of claim 1, wherein the block extending step comprises the steps of: interpolating pixels horizontally by using a horizontal context template; and after the horizontal interpolation, interpolating pixels vertically by using a vertical context template.

6. The method of claim 1, further comprising the steps of: comparing the extended block with the original picture in the frame unit and detecting the position of the block; and selectively bordering said plurality of blocks based on the detected position.

7. The method of claim 6, wherein said bordering step comprises the steps of:

copying the uppermost row of the extended block and thereby forming a top border in case that the extended block is positioned on the frame top side border of the original picture in the frame unit, and copying the values of pixels positioned on the right or left side for unknown pixels on said top border;

constructing a left border by using the leftmost column of the extended block in case that said extended block is positioned on the frame left side border of the original picture in the frame unit, and copying the values of pixels positioned on the upper or lower side for unknown pixels on said left border; and forming the top border with the lowermost row of upper adjacent block and the left border with the rightmost column of left block neighboring to the extended block, in case that said extended block is not positioned on the frame border of the original picture in the frame unit.

8. An apparatus having block dividing means, bordering means, and horizontal and vertical interpolation means and for interpolating an original picture in a frame unit (a binary picture: BAB) by using a context probability table set previously in order to reconstruct the original picture in the frame unit having low resolution as the picture having high resolution through an up-sampling, said apparatus comprising:

said bordering means being composed of block position detecting means for detecting a position of each of the divided blocks from said block dividing means in the original picture in the frame unit, copy means for receiving the position of the divided block outputted from said block position detection means and bordering the block of a given size on the top, left and upper side and left side of the block to be bordered, and memory for storing the blocks bordered from said copy means and outputting the information on the neighboring blocks of the block to be bordered to said copy means; and said horizontal and vertical interpolation means being composed of context calculating means for receiving the bordered blocks in said bordering means and calculating context indexes for respective pixels of the bordered blocks, probability table referring means for receiving the context indexes from said context calculating means and reading and getting probability values corresponding to the index on/from the context probability table set previously, probability detecting means for detecting whether or not the probability value read and gotten on/from said probability table referring means is more than 0.5, and interior/exterior interpolation means for interpolating a value "0" or "1" for the respective pixels on the bordered block in response to the detection result signal of said probability detecting means.

9. The apparatus of claim 8, wherein said bordering means copies 1 column and 1 row of each of the divided blocks on the left and upper side of the divided blocks, respectively and performs the boarding for the divided blocks, in case that the blocks divided in said block dividing means exist on the outermost of the original picture in the frame unit.

10. The apparatus of claim 8, wherein said copy means borders a divided block with pixel values in 8 rows of its left and top block if the divided block exists on the top and left side of the block to be bordered divided in said block dividing means, and borders the divided block with a value "0" if the divided block does not exist on the top and left side thereof.

11. The apparatus of claim 8, wherein said probability detecting means compares the probability value read and gotten from said probability table referring means with 0.5; controls so that said interior/exterior interpolation means interpolates a value "1" for the respective pixels on the bordered block, in case the probability value is more than 0.5; and controls so that said interior/exterior interpolation means interpolates a value "0" for the respective pixels on the bordered block, in case the probability value is less than 0.5.

*12. An interpolating method for reconstructing a restored picture having high resolution by up-sampling a binary picture having low resolution, said method comprising the steps of:*

*forming context templates for target pixels to be interpolated; obtaining a context index of the context templates and a probability value of the target pixel from context probability table by using the context index of the context templates;*

*deciding a value for the target pixel based on the context probability.*

*13. The method of claim 12, further comprising the steps of:*

*searching a location of a target block having target pixels to be interpolated in the binary picture; and*

*expanding a border of the target block at the searched location.*

* * * * *